(12) United States Patent
Fukazawa et al.

(10) Patent No.: US 8,032,526 B2
(45) Date of Patent: Oct. 4, 2011

(54) RECOMMENDATION INFORMATION GENERATION APPARATUS AND RECOMMENDATION INFORMATION GENERATION METHOD

(75) Inventors: Yusuke Fukazawa, Yokosuka (JP); Mirai Hara, Yokohama (JP); Hidetoshi Ueno, Yokosuka (JP); Masashi Onogi, Kawasaki (JP); Takefumi Naganuma, Yokosuka (JP); Midori Onogi, Yokohama (JP); Shoji Kurakake, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/936,758

(22) PCT Filed: Apr. 2, 2009

(86) PCT No.: PCT/JP2009/056869
§ 371 (c)(1),
(2), (4) Date: Dec. 23, 2010

(87) PCT Pub. No.: WO2009/125712
PCT Pub. Date: Oct. 15, 2009

(65) Prior Publication Data
US 2011/0093476 A1    Apr. 21, 2011

(30) Foreign Application Priority Data
Apr. 10, 2008   (JP) ............................... P2008-102795

(51) Int. Cl.
    G06F 17/30    (2006.01)
(52) U.S. Cl. ........ 707/722; 707/736; 707/738; 707/749; 707/767
(58) Field of Classification Search .......... 707/999.001, 707/999.005, 999.007, 722, 736, 738, 749, 707/767
    See application file for complete search history.

(56) References Cited

U.S. PATENT DOCUMENTS
6,493,702 B1 *  12/2002  Adar et al. .................... 707/738
(Continued)

FOREIGN PATENT DOCUMENTS
JP    2000 132559    5/2000
(Continued)

OTHER PUBLICATIONS

Christianini, N., "Kernel Induced Feature Spaces," 1st Edition, Kyoritsu Shuppan Co., Ltd., pp. 34-42, (Mar. 25, 2005), (with English language translation).

(Continued)

*Primary Examiner* — Charles Rones
*Assistant Examiner* — Rezwanul Mahmood
(74) *Attorney, Agent, or Firm* — Oblon, Spivak, McClelland, Maier & Neustadt, L.L.P.

(57) ABSTRACT

A recommendation information generation apparatus and a recommendation information generation method that can select a similar user appropriately even if the amount of history information is small. In an information distribution server, a user characteristic vector calculation unit calculates a user characteristic vector of each of users, and a similar user calculation unit calculates the degree of similarity between the users based on the calculated user characteristic vector of each of the users. The similar user calculation unit then selects a similar user who is similar to a first user based on the calculated degree of similarity. A relevance evaluation unit generates recommendation information for the first user based on the characteristic vector of the selected similar user.

7 Claims, 20 Drawing Sheets

U.S. PATENT DOCUMENTS

| | | | |
|---|---|---|---|
| 6,993,532 B1* | 1/2006 | Platt et al. | 707/736 |
| 7,487,151 B2* | 2/2009 | Yamamoto | 707/999.007 |
| 7,577,645 B2* | 8/2009 | Yamamoto et al. | 707/999.004 |
| 7,587,382 B2* | 9/2009 | Yamamoto et al. | 707/999.001 |
| 7,685,232 B2* | 3/2010 | Gibbs et al. | 709/203 |
| 7,725,467 B2* | 5/2010 | Yamamoto et al. | 707/738 |
| 7,873,634 B2* | 1/2011 | Desbiens | 707/749 |
| 2003/0167263 A1* | 9/2003 | Sasaki et al. | 707/3 |
| 2005/0159996 A1* | 7/2005 | Lazarus et al. | 705/10 |
| 2005/0165782 A1* | 7/2005 | Yamamoto | 707/7 |
| 2005/0262043 A1 | 11/2005 | Saito | |
| 2006/0036640 A1* | 2/2006 | Tateno et al. | 707/102 |
| 2006/0129547 A1* | 6/2006 | Yamamoto et al. | 707/5 |
| 2006/0248091 A1* | 11/2006 | Yamamoto et al. | 707/100 |
| 2006/0294093 A1* | 12/2006 | Yamamoto et al. | 707/5 |
| 2007/0124081 A1* | 5/2007 | Noguchi et al. | 702/19 |
| 2007/0250319 A1* | 10/2007 | Tateishi et al. | 704/251 |
| 2008/0141133 A1* | 6/2008 | Yamamoto et al. | 715/716 |
| 2008/0141134 A1* | 6/2008 | Miyazaki et al. | 715/716 |
| 2009/0077132 A1* | 3/2009 | Yamamoto et al. | 707/200 |
| 2009/0292732 A1* | 11/2009 | Manolescu | 707/104.1 |
| 2009/0307296 A1* | 12/2009 | Gibbs et al. | 709/201 |
| 2010/0161600 A1* | 6/2010 | Higgins et al. | 707/736 |
| 2010/0169313 A1* | 7/2010 | Kenedy et al. | 707/736 |
| 2011/0040790 A1* | 2/2011 | Tateno | 707/780 |
| 2011/0072013 A1* | 3/2011 | Mosoi et al. | 707/736 |

FOREIGN PATENT DOCUMENTS

| | | |
|---|---|---|
| JP | 2002 215665 | 8/2002 |
| JP | 2005 332265 | 12/2005 |
| JP | 2007 073014 | 3/2007 |

OTHER PUBLICATIONS

Fukazawa, Y., et al., "Automatic Mobile Menu Customization Based on User Operation History," The Institute of Electronics, Information and Communication Engineers, total 10 pages, (Aug. 7, 2008), (with English language translation).

International Search Report issued Apr. 28, 2009 in PCT/JP09/056869 filed Apr. 2, 2009.

International Preliminary Report on Patentability issued Dec. 9, 2010 in International Application No. PCT/JP2009/056869.

* cited by examiner

Fig.7

| CONTENT ID | CATEGORY | TITLE | RECOMMENDATION TEXT |
|---|---|---|---|
| C1 | CD | Celine Dion Complete Best | Celine Dion receiving a great deal of attention because of her upcoming Japan tour in March that is her first tour in the country since nine years prior. Due to her song being used for an au LISMO TV commercial, a duet with Yuna Ito, she is becoming increasingly popular recently among the fans of the both of these and many other people in general. With perfect timing, this must-have best-of album is being released as a perfect introduction to all the classic songs of Celine Dion. |
| C2 | DVD (FOREIGN FILM) | L.A. Confidential 10th Anniversary Limited Edition | This movie is set in Los Angeles of the fifties where turf battles were becoming increasingly intense. A murder of six men and women including an ex-detective occurs at a coffee shop in the downtown area. Bud (Russell Crowe), who was a friend of the murdered ex-detective, begins an investigation into the crime. He starts to get close to a beautiful blonde woman named Lynn (Kim Baysinger) who was with the murdered woman. |
| C3 | DVD (MUSIC VIDEO) | Tour: Wild Peace: Final At Saitama Super Arena 2007.1.14 | The Tokyo Ska Paradise Orchestra has wowed audiences around the world as well as in Japan with their "Tokyo Ska". The "Tokyo Ska Paradise Orchestra 2006 "Wild Peace" Tour resulted in their largest and longest tour with more than 70 performances over six months in Japan and Europe. It was also the hardest and toughest one for them. |
| C4 | BOOK | Ryoma-ga-Yuku | A historical novel about Ryoma's heroic life in eight volumes. It depicts from the first scene where Ryoma leaves for the Chiba Dojo to the last scene where Ryoma is assassinated. The contents of the novel include a variety of scenes covering the conditions at the end of the Edo period. Miss Otazu, who is an original character of the novel, is so attractive. |
| C5 | TV PROGRAM | At That Time History Moved Grand Family of the Heian Dynasty | This show takes place during the Heian dynasty in the late 10th century. Conspiracies and political battles among the aristocrats were common in relation to the elite positions in the imperial court. Fujiwarano Michinaga made his debut in the aristocracy at the age of 15. Michinaga, who had experienced the feud of the Fujiwara family, was determined to build a long-lasting peaceful and stable administration with the backing of the Emperor's authority. |

Fig.8

| CONTENT ID | FEATURE VECTOR | | | | | | | |
|---|---|---|---|---|---|---|---|---|
| | FINANCE | TRAVEL | TV | BOOK | MOVIE | MUSIC | SOCCER | ARTISTIC CULTURE |
| C1 | 0 | 0 | 0 | 0 | 0 | 1 | 0 | 0 |
| C2 | 0 | 0 | 0 | 0 | 1 | 0 | 0 | 1 |
| C3 | 0 | 1 | 0 | 0 | 0 | 1 | 0 | 0 |
| C4 | 0 | 0 | 0 | 1 | 0 | 0 | 0 | 1 |
| C5 | 0 | 0 | 1 | 0 | 0 | 0 | 0 | 1 |

*Fig.14*
(a)
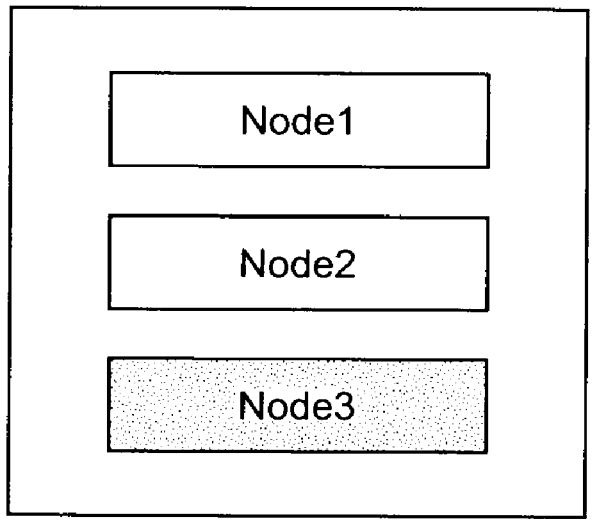
(b)
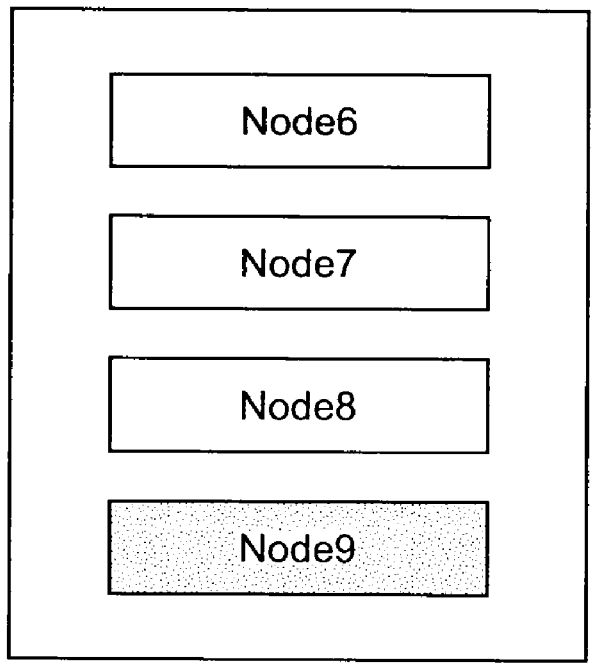

*Fig.15*
(a)
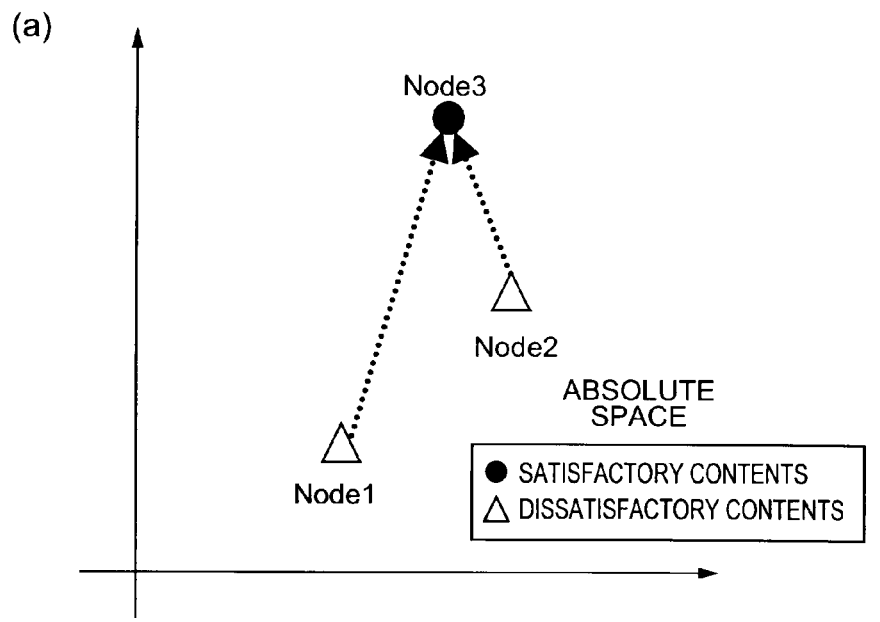
(b)
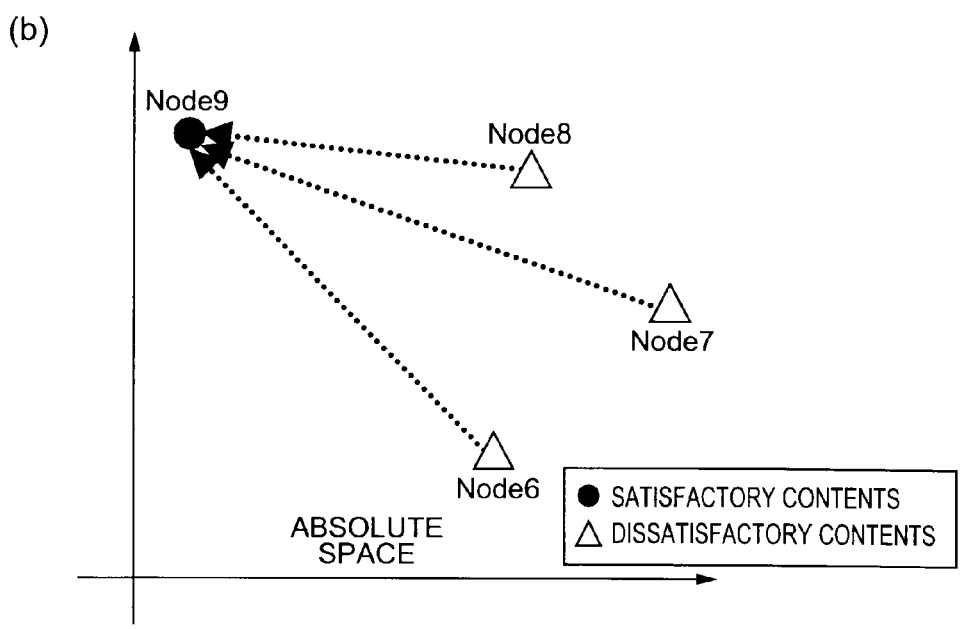

Fig.17
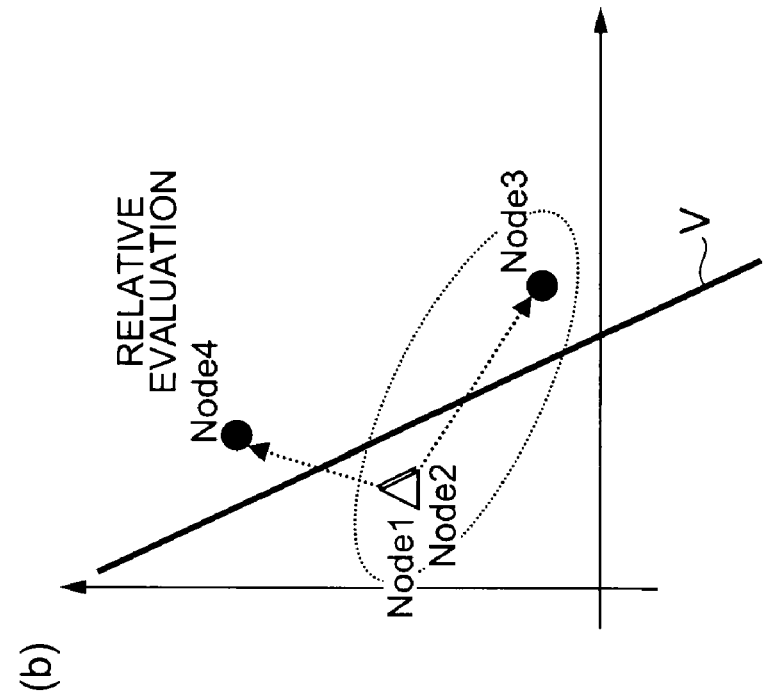
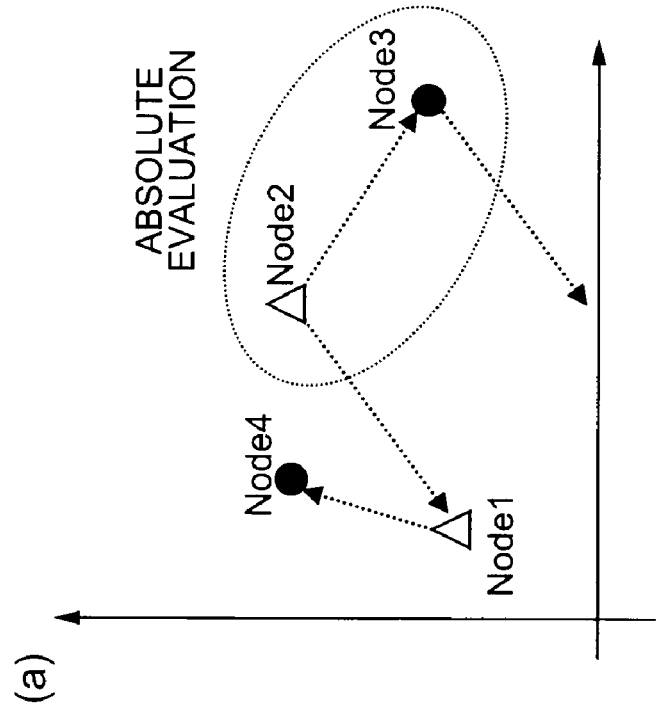

Fig.20

| TERMINAL FUNCTION | CHARACTERISTIC VECTOR | | | | |
|---|---|---|---|---|---|
| | PHONE | INTERNET | TEXT | MEMO | TV |
| INCOMING MESSAGE | 1 | 0 | 1 | 0 | 0 |
| VIDEOPHONE | 1 | 0 | 0 | 0 | 1 |
| ONE SEG | 0 | 1 | 0 | 0 | 1 |
| SCREEN MEMO | 0 | 1 | 0 | 1 | 0 |
| TEXT MEMO | 0 | 0 | 1 | 1 | 0 |

RECOMMENDATION INFORMATION GENERATION APPARATUS AND RECOMMENDATION INFORMATION GENERATION METHOD

TECHNICAL FIELD

The present invention relates to a recommendation information generation apparatus and a recommendation information generation method for generating recommendation information.

BACKGROUND ART

Emphasis filtering methods in that a similar user is obtained based on the comparison between a history of a user and those of other users to recommend contents that are often browsed by the similar user have been developed. Patent Document 1 (JP-2002-215665A) discloses that a cooperative user who has the most similar preferences to those of an object user is selected to select contents that are to be recommended based on the profile of the cooperative user, for example.

RELATED-ART DOCUMENT

[Patent Document]
Patent Document 1: JP-2002-215665A

DISCLOSURE OF THE INVENTION

Problems to be Solved by the Invention

The technology described in Patent Document 1, however, has a problem in that recommendation information cannot be determined until the access history is sufficiently increased. In other words, when a user who has similar preferences is selected, because the user needs to select more than one of the same contents as those of an object user, a user who doe not select the same contents as those of the object user cannot be recognized as a similar user. As a result, a certain amount of the access history needs to be accumulated. Accordingly, it is difficult to generate recommendation information based on the similar user in a state where the access history of each of the users is accumulated in a small amount.

An object of the present invention is to provide a recommendation information generation apparatus and a recommendation information generation method that can select a similar user appropriately, even if the amount of history information is small.

Means for Solving the Problems

To solve the above problems, a recommendation information generation apparatus according to the present invention includes: a vector acquisition means that acquires a user characteristic vector of each of users; a similarity calculation means that calculates the degree of similarity between the users based on the user characteristic vector of each of the users that is acquired by the vector acquisition means; a selection means that selects a similar user who is similar to a first user based on the degree of similarity calculated by the similarity calculation means; and a generation means that generates recommendation information for the first user based on the characteristic vector of the similar user selected by the selection means.

A recommendation information generation method according to the present invention includes: acquiring a user characteristic vector of each of users; calculating the degree of similarity between the users based on the user characteristic vector of each of the users that is acquired in the acquiring step; selecting a similar user who is similar to a first user based on the degree of similarity calculated in the calculating step; and generating recommendation information for the first user based on the characteristic vector of the similar user selected in the selecting step.

According to the present invention, a user characteristic vector of each of users is acquired, and the degree of similarity between the users is calculated based on the acquired user characteristic vector of each of the users. A similar user who is similar to a first user is then selected based on the calculated degree of similarity, and recommendation information for the first user can be generated based on the characteristic vector of the selected similar user. In this manner, by evaluating the degree of similarity between the users using the user characteristic vectors, it is possible to determine a similar user more accurately than in the related art without obtaining a large amount of history information. Thus, recommendation information based on the similar user can be generated. In the related art, for example, a similar user needs to be determined based on 10,000 pieces of browsing history information. By contrast, according to the present invention, it is possible to determine a similar user accurately by using about ten pieces of browsing history information.

In the recommendation information generation apparatus according to the present invention, the vector acquisition means is preferably composed of a receiving means that receives a selection of one optional item from a plurality of optional items by a user operation; a storage means that stores a satisfactory feature vector of the optional item that is received by the receiving means and dissatisfactory feature vectors of optional items that are not received by the receiving means; and a user characteristic vector generation means that generates an orthogonal vector perpendicular to a separation plane for separating the satisfactory feature vector of the selected optional item and the dissatisfactory feature vectors of the non-selected optional items, which are stored in the storage means, as a user characteristic vector.

According to the present invention, a selection of one optional item from a plurality of optional items by a user operation is received, and a satisfactory feature vector of the optional item that is received and dissatisfactory feature vectors of optional items that are not received by the receiving means are stored. An orthogonal vector perpendicular to a separation plane for separating the satisfactory feature vector of the selected optional item and the dissatisfactory feature vectors of the non-selected optional items, which are stored, can be generated as a user characteristic vector. In this manner, an accurate user characteristic vector can be generated.

In the recommendation information generation apparatus according to the present invention, the vector acquisition means is preferably composed of: a receiving means that receives a selection of one optional item from a plurality of optional items by a user operation and non-selected optional items; and a user characteristic vector generation means that generates a user characteristic vector based on dissatisfactory feature vectors of the optional items that are not received by the receiving means.

According to the present invention, a selection of one optional item from a plurality of optional items by a user operation and non-selected optional items are received, and a user characteristic vector is generated based on dissatisfactory feature vectors of the optional items that are not received, which makes it possible to generate a user characteristic vector based on the tendency of the non-selected optional items, such as contents and operations.

In the recommendation information generation apparatus according to the present invention, the generation means preferably evaluates a browsed content that is browsed by the similar user based on the degree of similarity that is calculated by the similarity calculation means and an inner product value of a user characteristic vector of the similar user and a feature vector of the browsed content, and generates recommendation information from the browsed content based on the evaluation.

According to the present invention, the browsed content browsed by the similar user is evaluated based on the calculated degree of similarity and the inner product value of the user characteristic vector of the similar user and the feature vector of the browsed content, and recommendation information is generated from the browsed content based on the evaluation. In this manner, it is possible to perform a weighting process depending on the degree of similarity, and generate recommendation information in accordance with results of the weighting process. Accordingly, appropriate recommendation information can be generated depending on the degree of similarity.

Effects of the Invention

According to the present invention, by evaluating the degree of similarity between users using user characteristic vectors, it is possible to determine a similar user more accurately than in the related art without obtaining a large amount of history information, and to generate recommendation information based on the similar user.

BRIEF DESCRIPTION OF THE DRAWINGS

FIG. 7 is an explanatory diagram showing stored contents in a content management table 205a.

FIG. 8 is an explanatory diagram showing stored contents in a content characteristic vector management table 207b.

FIG. 14 is an explanatory diagram showing configuration examples of menu screens in a history event a and a history event b.

FIG. 15 is a diagram showing position relations of characteristic vectors of the contents selected on the menu screens in feature spaces.

FIG. 17 is an explanatory diagram when processing is performed with a relative space in the case where a separation plane cannot be generated.

FIG. 20 is an explanatory diagram showing parameters of characteristic vectors in a feature space related to operation.

Figure 1:
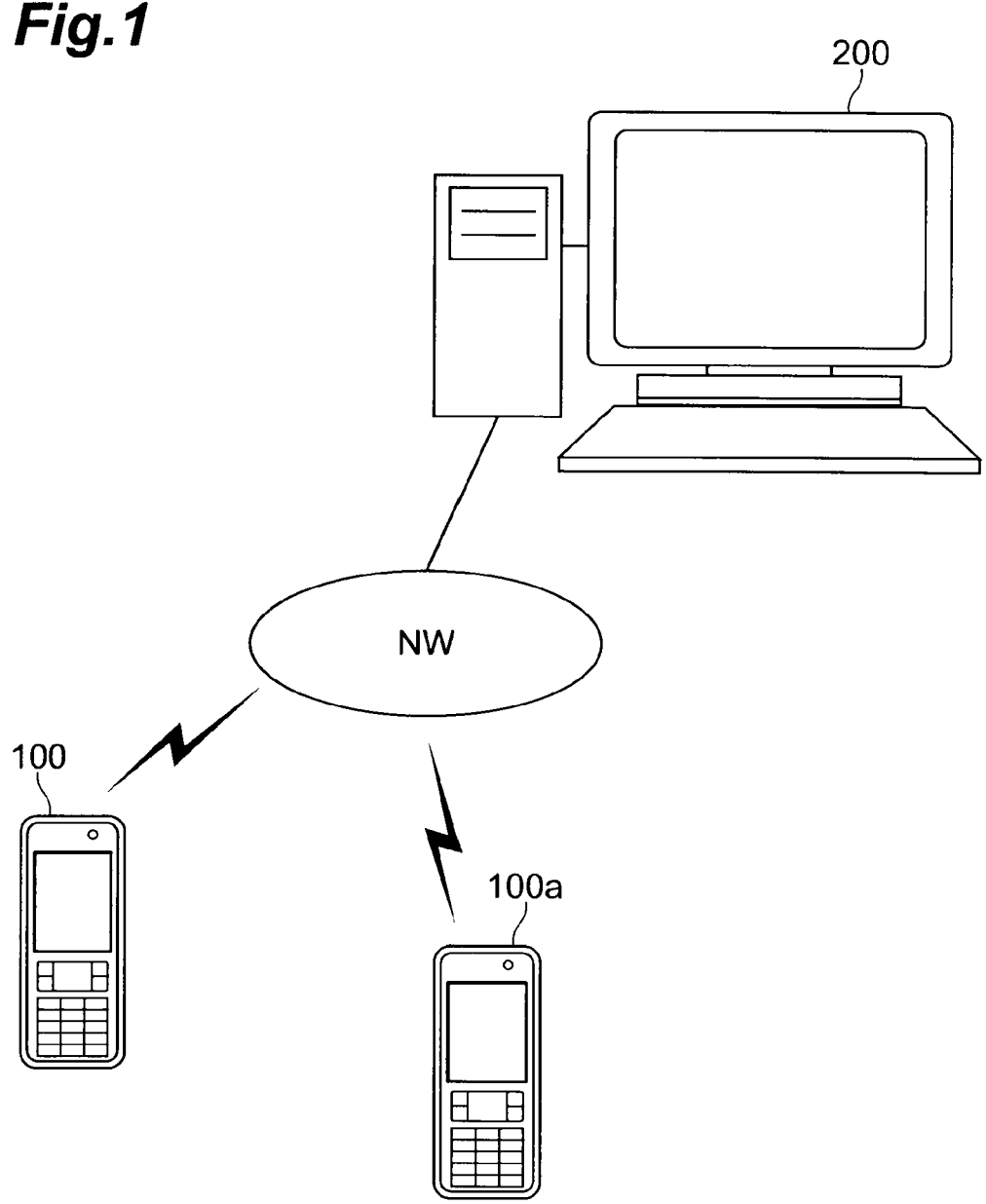
FIG. 1 is a system configuration diagram showing the system configuration of a recommendation information distribution system.

DESCRIPTION OF THE REFERENCE NUMERALS 100 cell phone
100a cell phone
101 browser
102 history sending unit
103 recommendation request sending unit
104 distributed information display
200 information distribution server
201 content request receiving unit
202 recommendation request receiving unit
203 history class separation unit
204 user characteristic vector calculation unit
205 distributed information storage
205a content management table
207 history storage
207a user characteristic vector management table
207b content characteristic vector management table
207c browsing history table
208 content sending unit
209 similar user calculation unit
210 relevance evaluation unit

EMBODIMENT OF THE INVENTION

Embodiments of the present invention will be described with reference to the accompanying drawings. Like numerals refer to like components, and redundant explanation thereof will be omitted, when possible.

FIG. 1 is a system configuration diagram showing the system configuration of a recommendation information distribution system including a cell phone 100 and an information distribution server 200 according to an embodiment of the present invention. The information distribution server 200 distributes contents that are accessed by a cell phone 100a belonging to a user who has characteristics similar to those of a user of the cell phone 100 to the cell phone 100 in response to a request therefrom. The contents to be distributed as recommendation information preferably include contents that are not evaluated yet for the user, such as Web contents that the user has not browsed yet, contents that constitute TV program listings, and contents in which new books to be released or the like are reviewed. The information distribution server 200 obtains contents from other contents providers in response to an access request from the cell phone 100 belonging to each user, and distributes the obtained contents thereto.

The access history is collected at this time. The information distribution server 200 may be configured to obtain the access history that is sent from the cell phone 100.

Figure 2:
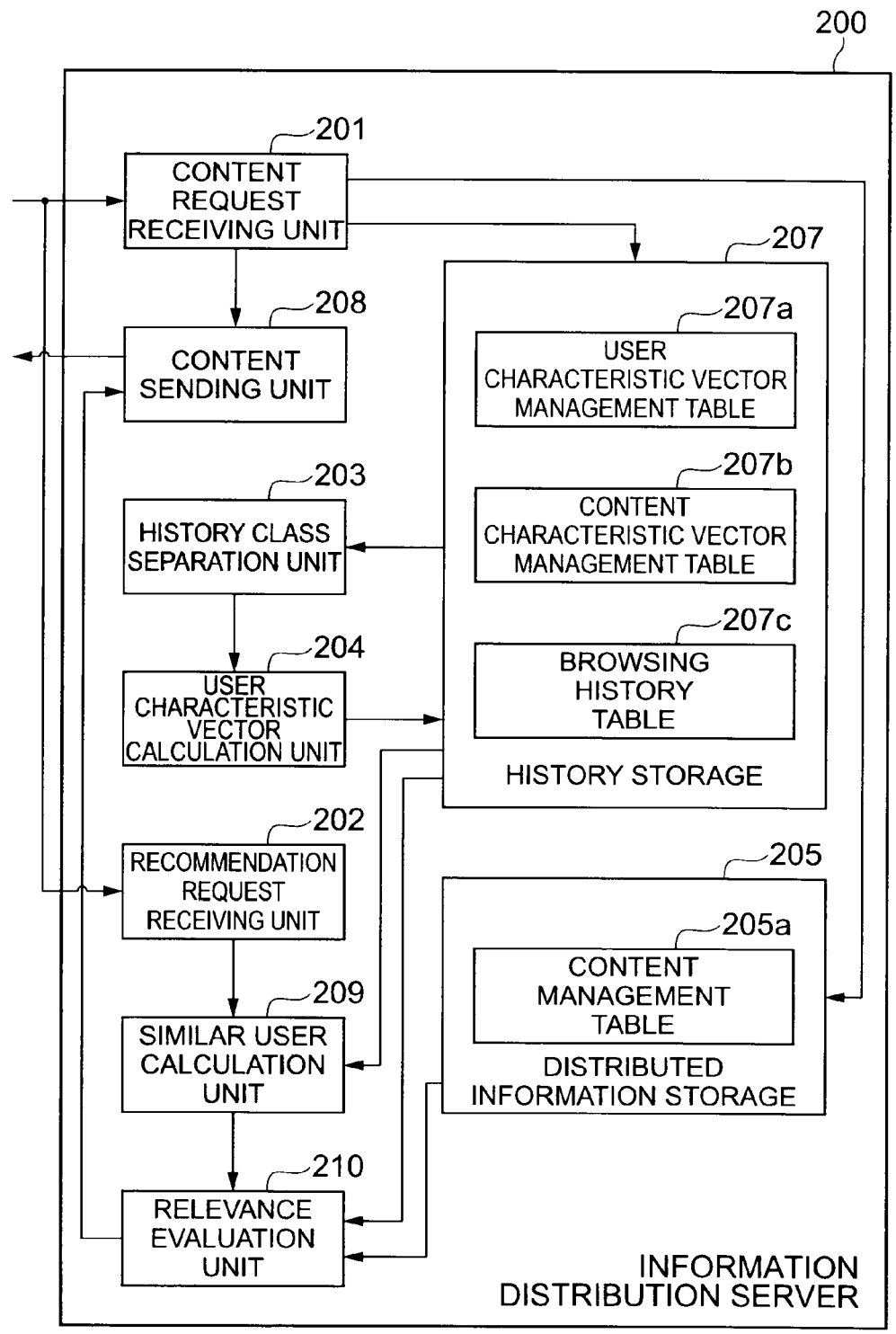
FIG. 2 is a block diagram of the functional configuration of an information distribution server 200.

The configuration of the information distribution server 200 will be described using FIG. 2. FIG. 2 is a block diagram of the functional configuration of the information distribution server 200. The information distribution server 200 is configured to include a content request receiving unit 201, a recommendation request receiving unit 202, a history class separation unit 203, a user characteristic vector calculation unit 204, a distributed information storage 205, a history storage 207, a content sending unit 208, a similar user calculation unit 209, and a relevance evaluation unit 210.

Figure 3:
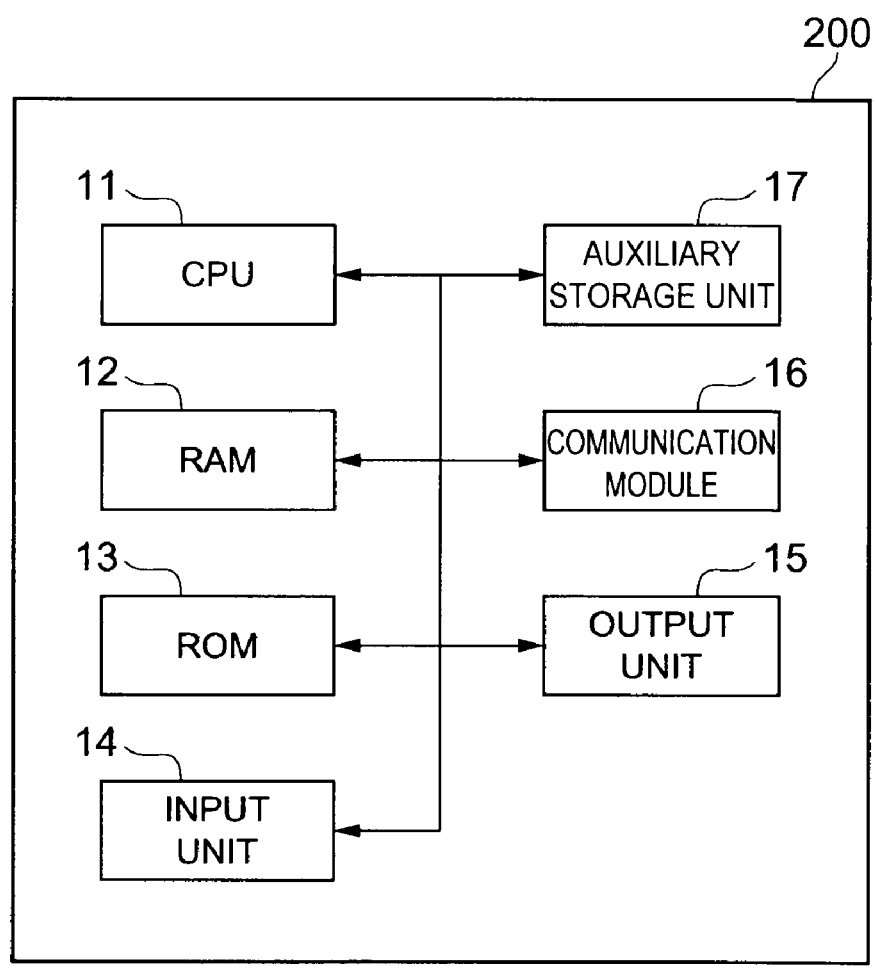
FIG. 3 is a hardware configuration diagram of the information distribution server 200.

FIG. 3 is a hardware configuration diagram of the information distribution server 200. As illustrated in FIG. 3, the information distribution server 200 illustrated in FIG. 2 is physically configured as a computer system that includes a central processing unit (CPU) 11, a random access memory (RAM) 12 and a read only memory (ROM) 13 serving as main storing devices, an input unit 14 such as a keyboard and a mouse serving as an input device, an output unit 15 such as a display, a communication module 16 serving as a data sending and receiving device such as a network card, and an auxiliary storage unit 17 such as a hard disk. The functions illustrated in FIG. 2 are performed by: loading predetermined computer software on the hardware of the CPU 11, the RAM 12 or the like in FIG. 3; operating the input unit 14, the output unit 15, and the communication module 16 under the control of the CPU 11; and reading and writing data from and to the RAM 12 and the auxiliary storage unit 17. Each of the functional blocks will be described based on the functional blocks illustrated in FIG. 2.

The content request receiving unit 201, which obtains contents from contents providers on the network in response to a request for the contents from the cell phone 100, can collect the access history by receiving the request for the contents and the URLs thereof from the cell phone 100. The collected access history (e.g., URLs) is output to the history storage 207. The content request receiving unit 201 collects the access history such that actually accessed contents (URLs) on a menu screen (event) are distinguished from contents that are not accessed actually even though being displayed on the menu screen.

The content request receiving unit 201 may receive access history information collected by the cell phone 100 as well as an access request, and output the information to the history storage 207. In the same manner as described above, the cell phone 100 is configured to send access history information to the information distribution server 200 such that selected contents are distinguished from non-selected contents on a menu screen.

The recommendation request receiving unit 202 receives a distribution request for recommendation information from the cell phone 100 together with the user ID of the user of the cell phone 100. When receiving the distribution request, the recommendation request receiving unit 202 informs the similar user calculation unit 209 of the receipt and instructs the unit to extract a similar user. In a modification thereof, the recommendation request receiving unit 202 may output the receipt of the recommendation request to the user characteristic vector calculation unit 204, cause the unit to calculate a user characteristic vector at this point, inform the similar user calculation unit 209 of the result, cause the unit to extract a similar user, and then cause the content sending unit 208 to distribute contents that are browsed by the similar user as recommendation information.

The history class separation unit 203 generates a separation plane for separating contents into a satisfactory class and a dissatisfactory class based on characteristic vectors of the contents included in browsing history information that is stored in the history storage 207 (browsing history table 207c). The satisfactory class here means a class including actually selected contents alone among a plurality of contents that are displayed in a selectable state on a menu screen for accessing certain contents. The dissatisfactory class means a class including non-selected contents alone on the menu screen. The history class separation unit 203 can separate these classes by generating a separation plane that can separate characteristic vectors of the contents into the satisfactory class and the dissatisfactory class using the SVM method or the NN method. In the SVM (Support Vector Machine) method, a plane that maximizes the minimum distance between nodes of each class (between characteristic vectors) is defined as a separation plane. In the NN method, a plane whose perpendicular is a line connecting the centers of gravity of the classes, that is, a line connecting the center of gravity of the satisfactory class and that of the dissatisfactory class that are calculated based on characteristic vectors of the contents is defined as a separation plane. In the NN method, the separation plane is not necessarily calculated, and the line connecting the center of gravity of the dissatisfactory class and that of the satisfactory class may be defined as a user characteristic vector.

Figure 4:
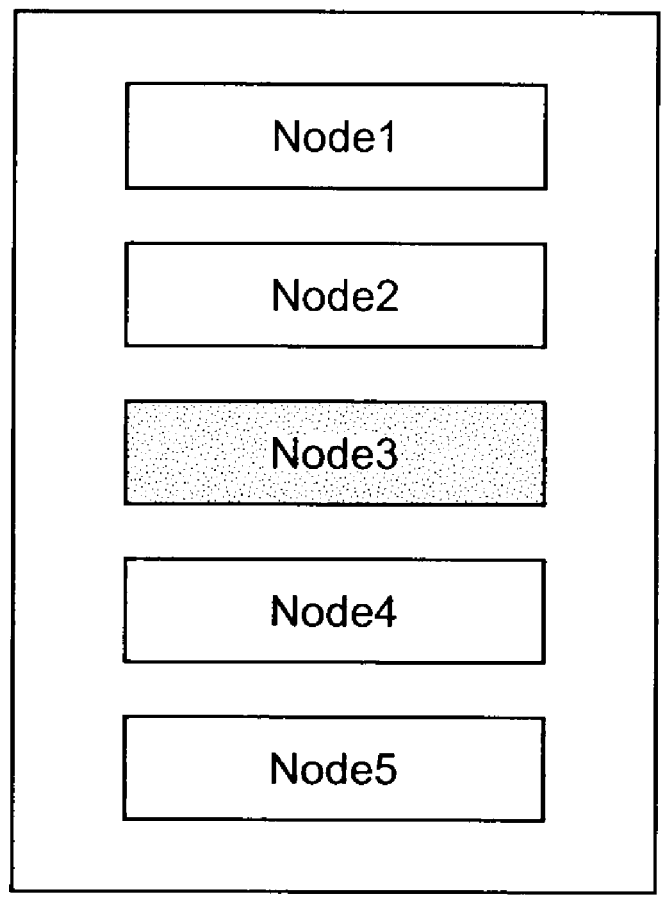
FIG. 4 is an explanatory diagram showing an example of a menu screen displayed on a cell phone 100.

A specific method for generating a separation plane will be described. FIG. 4 is an explanatory diagram showing an example of a menu screen displayed on the cell phone 100. As illustrated in FIG. 4, Node 1 to Node 5 are displayed. The Node indicates an optional item, such as an item distinguished by categories on a menu screen on the Web, and a title of a Web page. Node 1 indicates contents related to cars, and Node 2 indicates contents related to finance, for example. The user selects any of Node 1 to Node 5 to browse the contents corresponding thereto.

Figure 5:
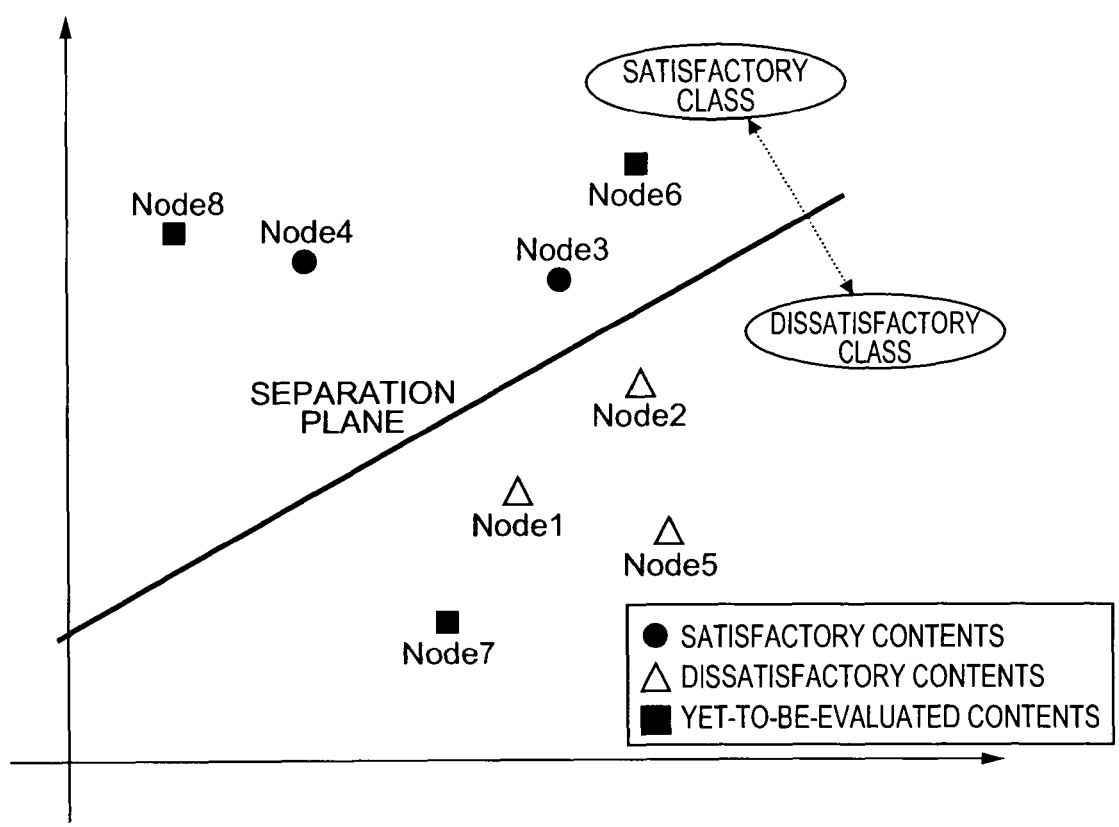
FIG. 5 is a conceptual diagram showing the processing concept when a separation plane is generated.

FIG. 5 is a conceptual diagram showing the processing concept when a separation plane is generated. FIG. 5 shows position relations in a feature space between characteristic vectors of the contents, which include the contents that are selected by the user and the contents that are not selected on the menu screen in FIG. 4. As illustrated in FIG. 5, the parts represented by circles are satisfactory contents (Node 3 and Node 4), the parts represented by triangles are dissatisfactory contents (Node 1, Node 2, and Node 5), and the parts represented by quadrangles are yet-to-be-evaluated contents that are not known yet (Node 8 and Node 7). The separation plane is generated to separate the satisfactory contents and the dissatisfactory contents. The yet-to-be-evaluated contents are not taken into account in the separation processing. Although the feature space in the diagram is expressed by a two-dimensional plane for convenience, vector axes are present in an amount corresponding to parameters that constitute the vectors. Thus, the feature space is composed of twenty-or-more-dimensional vectors generally.

Figure 6:
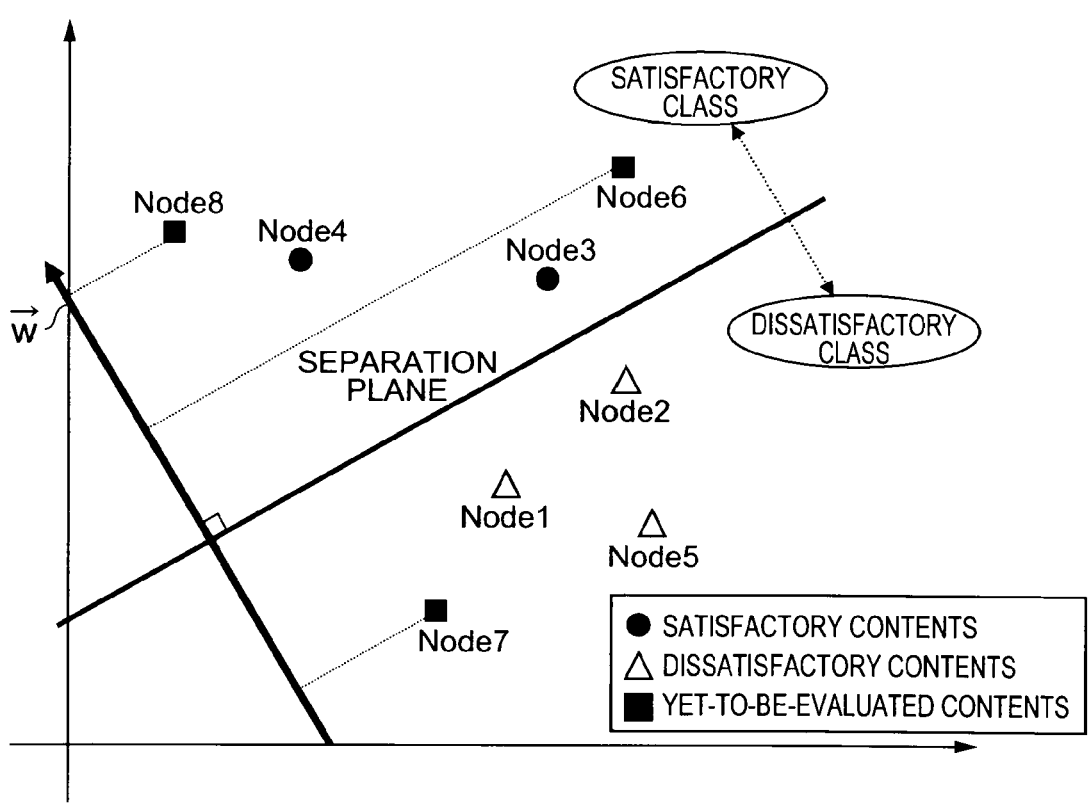
FIG. 6 is a conceptual diagram showing the concept when a user characteristic vector is calculated based on the separation plane.

The user characteristic vector calculation unit 204 calculates an orthogonal vector perpendicular to the separation plane that is generated by the history class separation unit 203 to define the vector as a user characteristic vector. FIG. 6 shows a specific example thereof. FIG. 6 is a conceptual diagram showing the concept when a user characteristic vector is calculated based on the separation plane. As illustrated in FIG. 6, the user characteristic vector calculation unit 204 calculates a user characteristic vector w that is an orthogonal vector perpendicular to the separation plane. The user characteristic vector calculation unit 204 calculates the user characteristic vector every time a browsing history is collected and updates the user characteristic vector that is stored in a user characteristic vector management table 207a.

The distributed information storage 205 stores contents that are registered by an operator in advance or contents that have distribution requests received by the content request receiving unit 201 from the cell phone 100 and 100a serving as the users. The distributed information storage 205 also stores a content management table 205a. FIG. 7 is an explanatory diagram showing stored contents in the content management table 205a. As illustrated in FIG. 7, the content management table 205a stores user IDs, content IDs, categories, titles, and recommendation texts corresponding to each other. The user ID is identification information for specifying a user, such as specific information of the cell phone 100 or 100a. The content ID is identification information for specifying contents uniquely. The category indicates a type of information that is related to, for example, CDs, DVDs, books, and TV programs. The title is heading information to be displayed as recommendation information. When distributing recommendation information, the title is displayed. The recommendation text is the main body of recommendation information that is useful information for the user. The information that is stored in the content management table 205a may be input by an operator in advance, or be searched and extracted from a contents provider automatically to be narrowed down with a predetermined filter.

The similar user calculation unit 209 calculates the degree of similarity between a first user characteristic vector and user characteristic vectors of other users to extract a similar user similar to a first user who issues a recommendation request in accordance with the recommendation request that is received by the recommendation request receiving unit 202. More specifically, the similar user calculation unit 209 obtains the degree of similarity by calculating inner products of the first user characteristic vector and the user characteristic vectors of the other users that are stored in the user characteristic vector management table 207a. The similar user calculation unit 209 defines a user who has the biggest similarity as the similar user among a large number of the other users. The user characteristic vectors of the one user and the other users are normalized. The first user is a user of the cell phone 100, and the similar user is a user of the cell phone 100a.

The relevance evaluation unit 210 evaluates contents that are browsed by the similar user who is extracted by the similar user calculation unit 209 among the contents stored in the distributed information storage 205 to generate recommendation information in which the titles of the contents are arranged in descending order of the evaluation. More specifically, as represented by Formula (1), the relevance evaluation unit 210 extracts the user characteristic vector w of the cell phone 100a serving as the similar user and characteristic vector $C_1$ of the browsed contents that are browsed by the similar user from the user characteristic vector management table 207a and the browsing history table 207c, respectively, to calculate the inner product thereof. The relevance evaluation unit 210 then multiplies the inner product by the degree of similarity θ between the user characteristic vector of the user of the cell phone 100 and that of the user of the cell phone 100a to calculate the multiplied value. The relevance evaluation unit 210 generates recommendation information such that the titles of the contents are displayed in descending order of the degree of relevance that is represented by the multiplied value.

$$\text{Degree of relevance} = \text{User characteristic vector} \\ w \cdot \text{Characteristics vector } c_1 \times \text{Degree of similarity} \\ \theta \quad (1)$$

The history storage 207, which stores history information, stores the user characteristic vector management table 207a, a content characteristic vector management table 207b, and the browsing history table 207c.

The user characteristic vector management table 207a stores a user characteristic vector that is calculated by the user characteristic vector calculation unit 204 with a corresponding user ID for identifying a user.

The content characteristic vector management table 207b stores characteristic vectors of the contents that are registered by an operator in advance and then stored in the content management table 205a with corresponding information for specifying the contents (for example, content IDs and URLs). The content characteristic vector management table 207b stores information illustrated in FIG. 8, for example. As illustrated in FIG. 8, a plurality of parameters that constitute the characteristic vectors is stored with the corresponding content IDs. Although eight parameters are illustrated in FIG. 8, the characteristic vector is composed of more parameters generally. Besides the predetermined parameters, keywords that are extracted according to a morphological analysis for each of the contents may be added as parameters. A numerical value between 0 and 1 is allotted to each of the parameters that constitute the characteristic vector, which indicates that which characteristic vector has the feature.

The browsing history table 207c stores an address that is received by the content request receiving unit 201 or access history information that is collected by the unit with, for example, corresponding user IDs, content IDs (or URLs of the contents) and characteristic vectors of the contents (browsed contents and non-browsed contents).

The content sending unit 208 sends the contents obtained in response to the content request that is received by the content request receiving unit 201. For example, the content sending unit 208 sends the contents obtained in response to the content request that is received by the content request receiving unit 201, and sends the recommendation information that is generated in accordance with the evaluation results by the relevance evaluation unit 210 based on the contents stored in the distributed information storage 205 or the contents described in the browsing history that is stored in the browsing history table 207c in response to the recommendation request receiving unit 202.

The information distribution server 200 that is configured as described above can distribute recommendation information including the contents that are browsed by the user of the cell phone 100a, who is the similar user, in response to a request from the cell phone 100. Accordingly, by evaluating the degree of similarity between the users based on the user characteristic vectors, and distributing the contents that are browsed by the similar user as recommendation information, the degree of similarity between the users who have a small amount of browsing history can be evaluated.

In the present embodiment, a user characteristic vector is calculated by using the history class separation unit 203 and the user characteristic vector calculation unit 204, and is stored in the user characteristic vector management table 207a. However, it is not limited thereto, and the user characteristic vector may be stored in the user characteristic vector management table 207a as a fixed value. The fixed value includes, for example, a value that is manually generated based on results of a questionnaire survey.

A user characteristic vector may be calculated sequentially based on the characteristic vectors of the dissatisfactory contents alone, and be stored in the user characteristic vector management table 207a. The user characteristic vector calculation unit 204, for example, can generate a user characteristic vector based on the non-selected dissatisfactory contents alone without using the history class separation unit 203, and store it in the user characteristic vector management table 207a. In this case, the user characteristic vector calculation unit 204 calculates the center of gravity based on the dissatisfactory contents alone, defines the obtained center of gravity as the user characteristic vector, and stores it in the user characteristic vector management table 207a. The similar user calculation unit 209 determines the similar user based on the user characteristic vector.

Figure 9:
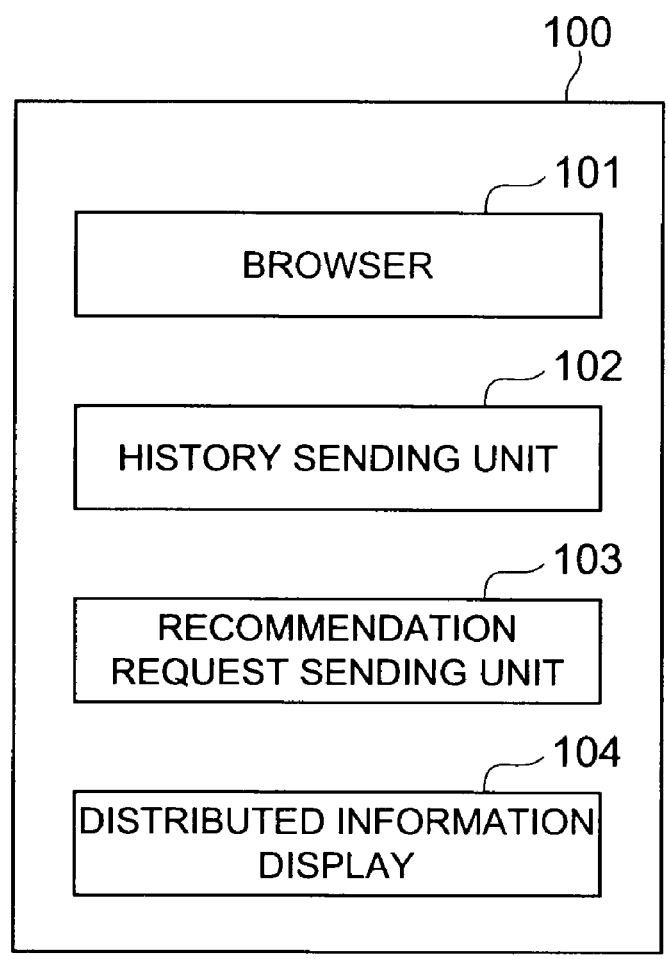
FIG. 9 is a block diagram of the functional configuration of the cell phone 100.

The cell phone 100 will now be described. FIG. 9 is a block diagram of the functional configuration of the cell phone 100. As illustrated in FIG. 9, the cell phone 100 is configured to include a browser 101, a history sending unit 102, a recommendation request sending unit 103, and a distributed information display 104. The cell phone 100 is configured with hardware such as a CPU, a RAM, and a ROM, in which the CPU is configured to operate according to the stored programs. More specifically, the cell phone 100 has a configuration similar to that of the information distribution server 200, which is achieved by the hardware configuration illustrated in FIG. 3. Each of the components will be described below.

The browser 101, which is an application part for connecting to the Internet, accesses a Web site that is arranged on the Internet to enable a user to browse contents that are maintained in the Web site. The browser 101 is configured to maintain the access history.

The history sending unit 102 sends the access history of the contents that are accessed by using the browser 101 (information of selected contents and non-selected contents on the identical menu screen). If the information distribution server 200 has a function to collect history information in each access, the history sending unit 102 is not necessarily configured.

The recommendation request sending unit 103 sends a request for recommendation information together with a user ID to the information distribution server 200 by a user operation of an operating unit, which is not shown.

The distributed information display 104 displays a menu screen and contents (Web pages) that are obtained by the browser 101.

The cell phone 100 that is configured as described above can access the Internet by using the browser 101 and maintain the access history. The history sending unit 102 can send the access history in response to a request from the information distribution server 200 or at a predetermined time.

Figure 10:
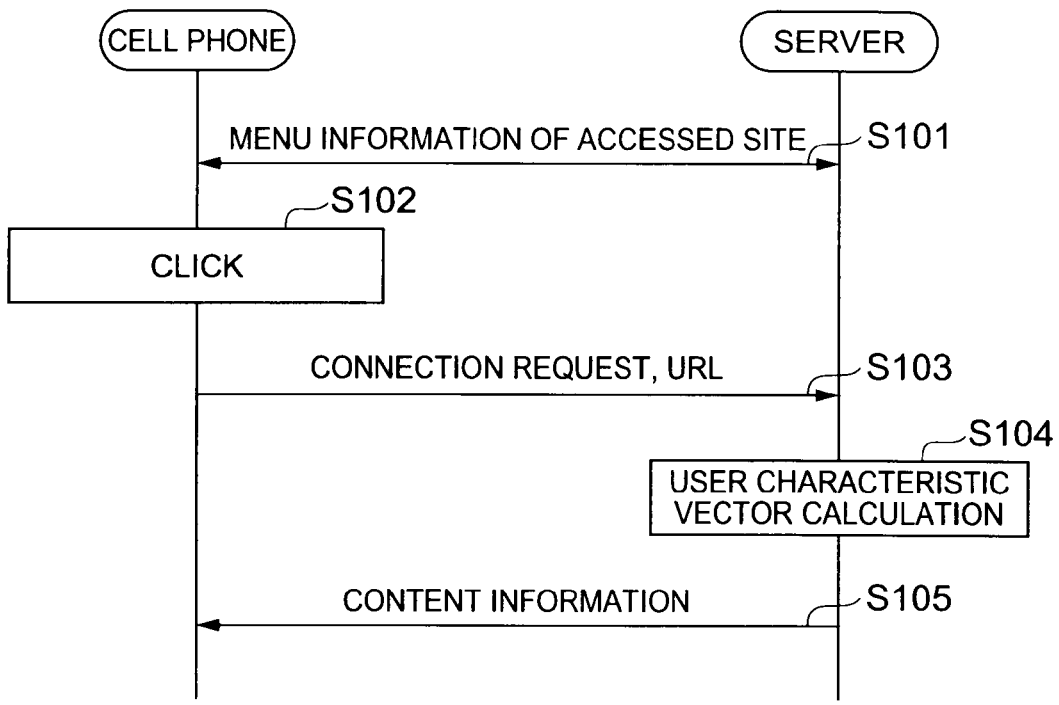
FIG. 10 is a sequence diagram showing the processing in the cell phone 100 and the information distribution server 200 when contents are distributed in response to a request from the cell phone 100.

The operations of the cell phone 100 and the information distribution server 200 will now be described. FIG. 10 is a sequence diagram showing the processing in the cell phone 100 and the information distribution server 200 when distributing contents in response to a request from the cell phone 100.

As illustrated in FIG. 10, the content sending unit 208 distributes a menu screen from the information distribution server 200 in response to a request from the browser 101 in the cell phone 100 (S101). The user of the cell phone 100 selects an arbitrary content (corresponding to Node described above) from the menu screen and the browser 101 in the cell phone 100 receives the selection (S102). The connection request to the contents and its address, that is, URL are then sent to the information distribution server 200 (S103).

In the information distribution server 200, the content request receiving unit 201 receives the URL that is then stored in the browsing history table 207c as an access history. Based on the access history, a user characteristic vector is calculated and stored (S104). The content sending unit 208 obtains the contents based on the address that is requested in S103 from a contents provider (not shown) and distributes the contents (S105). The calculation processing of the user characteristic vector and the distribution processing of the contents may be performed in reverse order.

Figure 11:
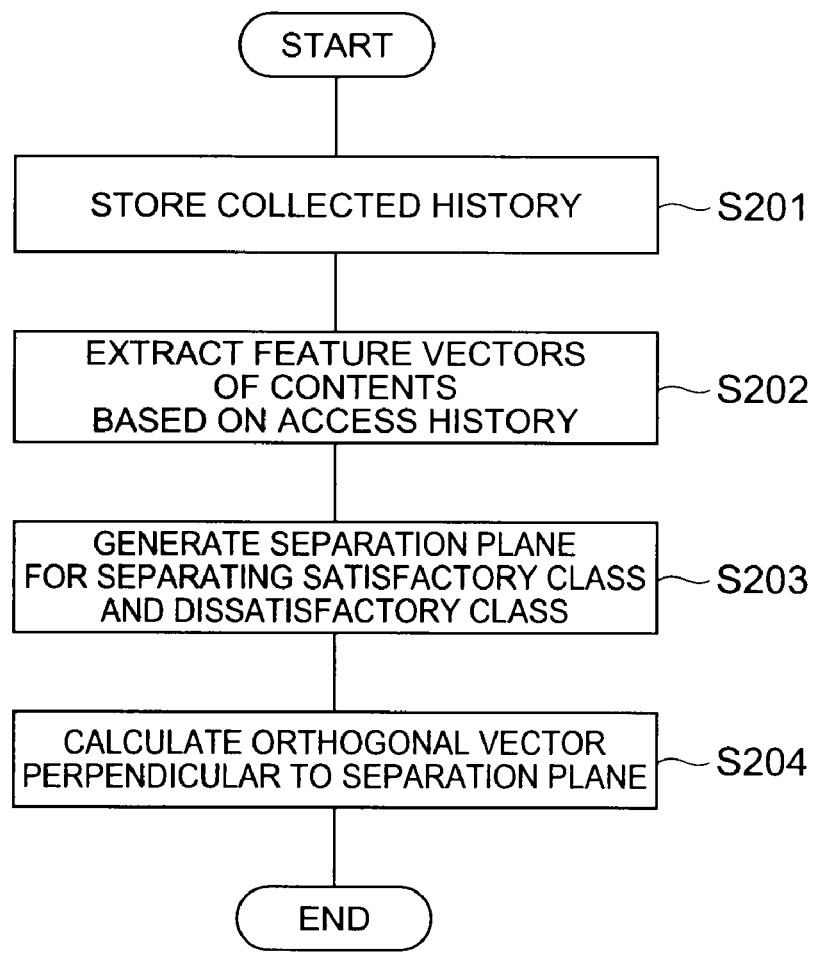
FIG. 11 is a flowchart showing the calculation processing of a user characteristic vector.

The calculation processing of the user characteristic vector in S104 will be described in detail. FIG. 11 is a flowchart showing the calculation processing of the user characteristic vector. As illustrated in FIG. 11, the access request received by the content request receiving unit 201 or the access history information indicated by the access history is stored in the browsing history table 207c as a newly added access history (S201).

The history class separation unit 203 extracts characteristic vectors of the contents belonging to the satisfactory class or the dissatisfactory class based on the access history information that is stored in the browsing history table 207c (S202). The history class separation unit 203 then generates a separation plane for separating the satisfactory class and the dissatisfactory class based on the characteristic vectors (S202). The user characteristic vector calculation unit 204 then calculates an orthogonal vector perpendicular to the generated separation plane to obtain the user characteristic vector (S204). The user characteristic vector thus obtained is maintained in the user characteristic vector management table 207a, and used for evaluation of the contents that are stored in the distributed information storage 205 when distributing the recommendation information.

Figure 12:
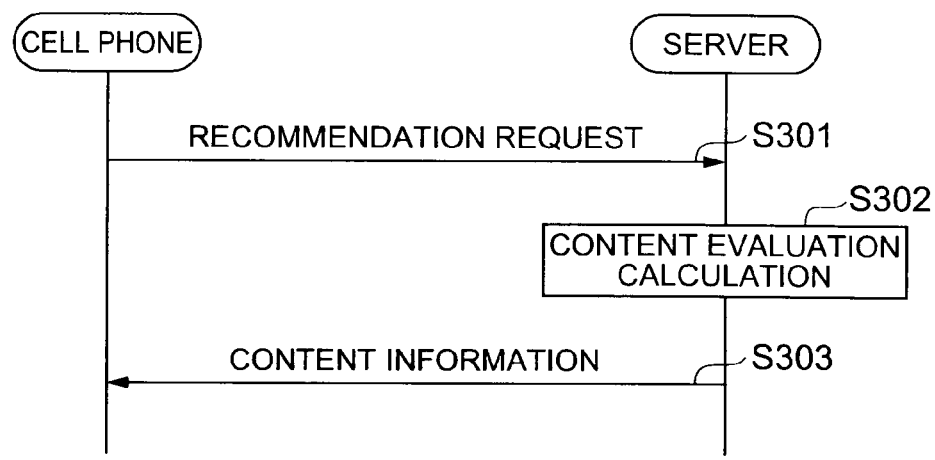
FIG. 12 is a sequence diagram when recommendation information is distributed.

The calculation processing of the degree of relevance when the contents browsed by the similar user are distributed as recommendation information according to the present embodiment will now be described. FIG. 12 is a sequence diagram when recommendation information is distributed. As illustrated in FIG. 12, the recommendation request sending unit 103 in the cell phone 100 sends a recommendation request including a user ID, and the recommendation request receiving unit 202 in the information distribution server 200 receives the recommendation request (S301). In the information distribution server 200, the degrees of relevance of the browsed contents that are browsed by the similar user and then stored in the distributed information storage 205 are calculated (S302). The relevance evaluation unit 210 calculates the degrees of relevance to generate recommendation information in which the titles of the contents are arranged in descending order of the degree of relevance. The content sending unit 208 then distributes the recommendation information thus generated (S303).

Figure 13:
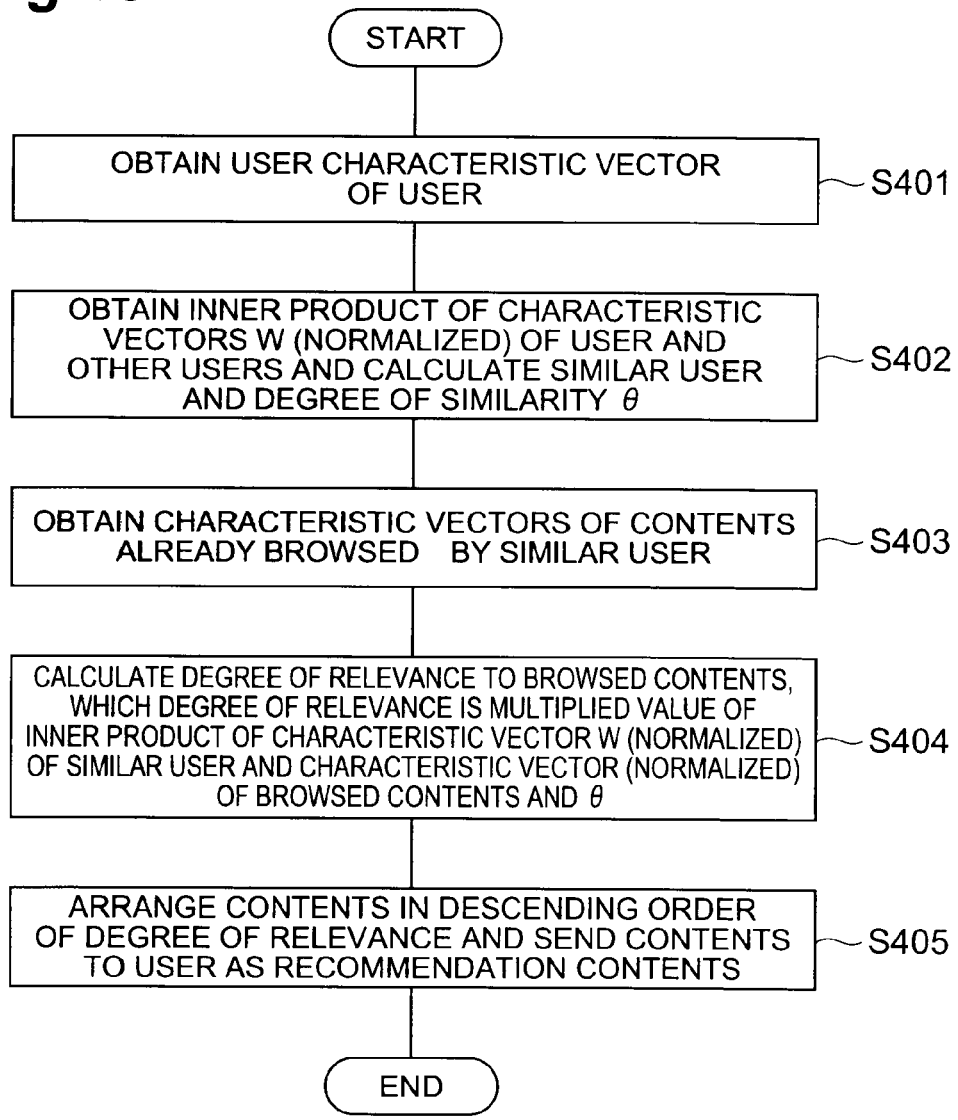
FIG. 13 is a flowchart showing the relevance calculation processing.

The calculation processing of the degree of relevance in S302 will be described in detail. FIG. 13 is a flowchart showing the calculation processing of the degree of relevance. As illustrated in FIG. 13, the relevance evaluation unit 210 obtains the corresponding user characteristic vector from the user characteristic vector management table 207a based on the user ID that is sent together with the recommendation request (S401). The similar user calculation unit 209 calculates the degree of similarity between the user who issues the recommendation request and the other users. In other words, the user characteristic vector of the user and those of the other users are extracted from the user characteristic vector management table 207a to calculate the inner products thereof.

The inner products of the user characteristic vector of the user and those of all the other users are calculated to determine the user who has the highest similarity (the largest inner product value) as the similar user (S402).

The relevance evaluation unit 210 obtains the characteristic vectors of the contents that have been already browsed by the similar user from the browsing history table 207c (S403). As represented by Formula (1), the inner product of the obtained characteristic vectors of the contents and the characteristic vector of the similar user is calculated. The inner product is then multiplied by the degree of similarity (inner product value) that is obtained in S402 to calculate the degree of relevance (S404). The relevance evaluation unit 210 generates the recommendation information in which the titles of the contents are arranged in descending order of the degree of relevance. The content sending unit 208 then distributes the generated recommendation information to the user (cell phone 100) (S405).

In this manner, it is possible to provide the contents that are browsed by the similar user as recommendation information by specifying the similar user according to the user characteristic vector.

<Generation of a Separation Plane in a Relative Space>

The method for generating the separation plane described above is performed according to the characteristic vectors of the contents in the absolute space. To improve the accuracy, the method using a relative space in which relative position relations are calculated may be applicable. The method for generating a separation plane by using a relative space will be described below. The processing thereof has the same structure as that of the above method except for the processing content in the history class separation unit 203.

FIG. 14 shows configuration examples of menu screens in a history event a and a history event b. FIG. 14A shows the menu screen in the history event a, which the menu screen is configured with Node 1 to Node 3. FIG. 14B shows the menu screen in the history event b, which the menu screen is configured with Node 6 to Node 9. Node 3 is selected in FIG. 14A, and Node 9 is selected in FIG. 14B.

FIG. 15 is a diagram showing position relations of the characteristic vectors of the contents that are selected on the menu screens illustrated in FIG. 14 in feature spaces. FIG. 15A shows the feature space (absolute space) of the contents selected in the history event a, and FIG. 15B shows the feature space (absolute space) of the contents selected in the history event b. In the same manner as described above, the selected contents are defined as the satisfactory contents, and the non-selected contents are defined as the dissatisfactory contents, whereby the contents can be classified into the satisfactory class and the dissatisfactory class, respectively.

Figure 16:
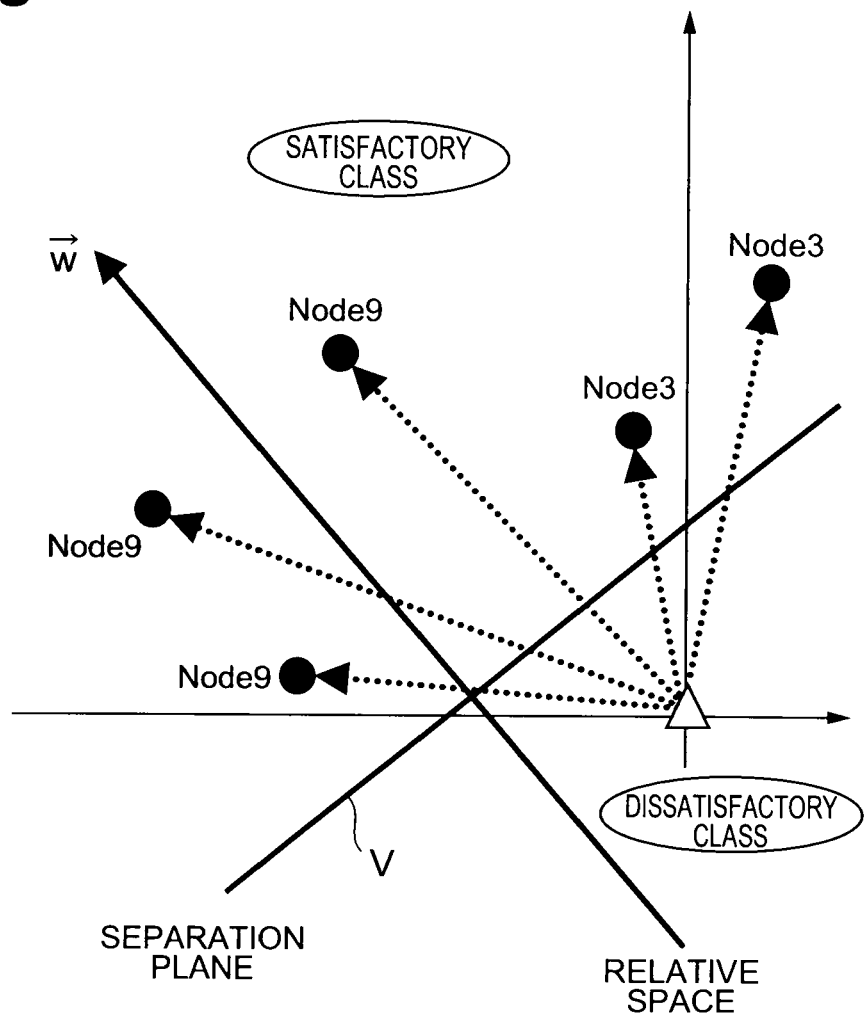
FIG. 16 is a diagram showing the characteristic vectors of the contents in the history events a and b in a relative space.

FIG. 16 is a diagram showing the characteristic vectors of the contents in the history events a and b in an identical feature space. FIG. 16 shows the relative space that indicates the positions of the characteristic vectors of the satisfactory contents when the characteristic vector of the dissatisfactory contents are set to the origin. For example, to compare Node 2 to Node 3, and Node 1 to Node 3 relatively, the feature space that indicates the positions of Node 3 with Node 1 and Node 2 being set to the origin, respectively, is defined as the relative space. More specifically, the relative space can be formed by subtracting the characteristic vector of Node 1 from the characteristic vector of Node 3. In the same manner as described above, the relative space can be formed with respect to the other Nodes by subtracting the characteristic vector of the contents serving as the object.

In the relative space, as illustrated in FIG. 16, the history class separation unit 203 generates the separation plane for separating the satisfactory class and the dissatisfactory class based on the characteristic vectors of the satisfactory contents and those of the dissatisfactory contents. The user characteristic vector calculation unit 204 then calculates the user characteristic vector w, which is an orthogonal vector perpendicular to the separation plane.

Accordingly, even when the history events are different from each other, the user characteristic vector can be generated by using the relative space, which makes it possible to generate a more discriminating user characteristic vector.

In this manner, the separation plane is generated by using the relative space, thus making it possible to generate the user characteristic vector. In FIG. 15 to FIG. 17, even if the feature spaces are treated as absolute spaces, the separation planes can be generated. However, the feature space may be composed of characteristic vectors that cannot generate a separation plane. In this case, the separation plane can be generated by using the above-described relative space. The method thereof will be described below.

FIG. 17A is a diagram showing characteristic vectors of contents in an absolute space. In FIG. 17A, it is assumed that Node 1 and Node 4 are the contents existing in the same event (menu screen), and that Node 2 and Node 3 are the contents existing in the same event. The circles are the characteristic vectors of the selected contents (satisfactory class) and the triangles are the characteristic vectors of the non-selected contents (dissatisfactory class).

As is obvious in FIG. 17A, the separation plane cannot be generated with respect to the contents of the characteristic vectors that have such position relations in the absolute space. The separation plane, which is a plane for separating the satisfactory class and the dissatisfactory class, fails to separate the classes without excess or deficiency in the example of FIG. 17A. Therefore, the absolute space needs to be transformed into the relative space that indicates relative position relations to generate the separation plane.

FIG. 17B is a diagram showing the characteristic vectors of the contents in a relative space. In the example of FIG. 17B, because Node 2 is translated such that Node 1 and Node 2 are present in the identical position, Node 3 corresponding to Node 2 is also translated. Such transformation of the absolute space into the relative space makes it possible to generate the separation plane v that can separate Node 1 (Node 2), which is the dissatisfactory contents, and Node 3 and Node 4, which are the satisfactory contents.

As described above, even if the separation plane cannot be generated in the absolute space, the separation plane can be generated by transforming the absolute space into the relative space, thus making it possible to calculate the user characteristic vector.

<Method for Generating a Separation Plane in View of Browse Frequency>

The processing in the history class separation unit 203 when weighting is carried out with the browse frequency of the contents and a separation plane is generated with the weighted characteristic vector will be described. The generation of the separation plane by using the NN method will be described below.

Figure 18:
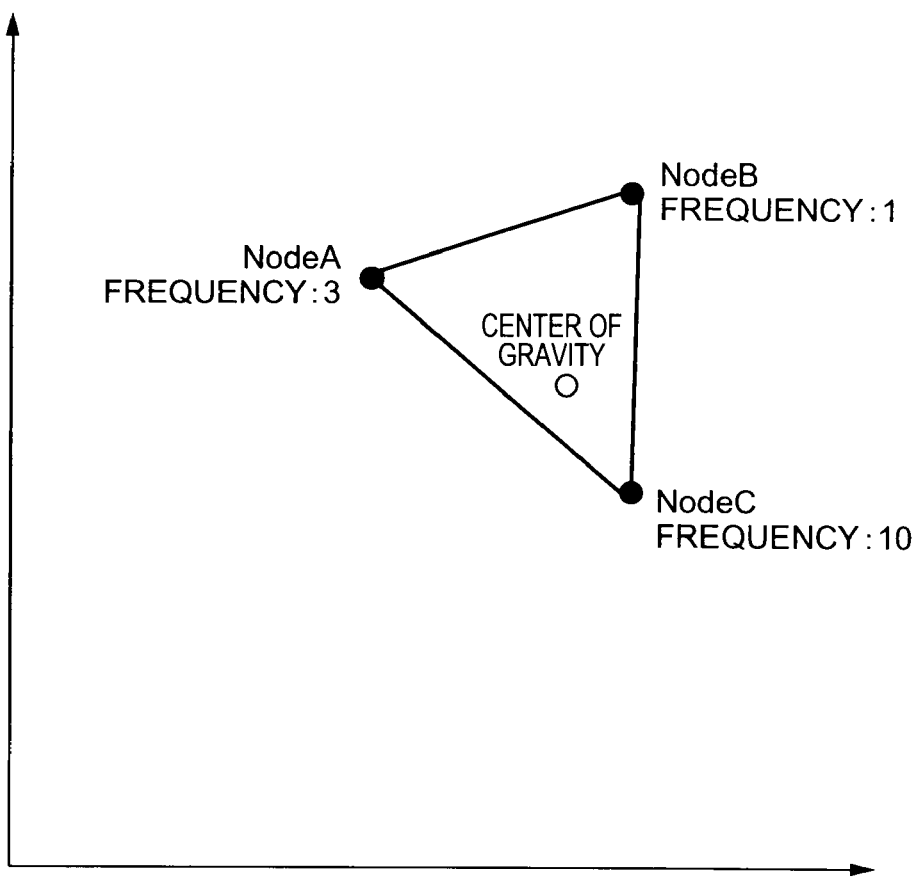
FIG. 18 is a conceptual diagram showing the processing for calculating the center of gravity of characteristic vectors in view of the browse frequency.

FIG. 18 is a conceptual diagram showing the processing for calculating the center of gravity of characteristic vectors in view of the browse frequency, which shows the feature space that indicates the positions of the characteristic vectors of the contents $c_1$ to $c_3$ corresponding to Node A to Node C. It is assumed that the browse frequency of the content $c_1$ is three times, that of the content $c_2$ is once, and that of the content $c_3$ is ten times. The browsing history table 207c preferably stores the browsing history of the browsed contents and the nonbrowsing history of the non-browsed contents, and needs to maintain the frequencies or store them in a state of being calculable.

In this case, the center of gravity of the contents $c_1$ to $c_3$ is calculated by the following formula (2):

[Formula 1]

$$\text{Center of gravity} = \frac{\sum_i c_i n_i}{\sum_i n_i} \quad (2)$$

It is to be noted that $c_i$ represents the characteristic vector of the browsed contents, and that $n_i$ represents the browse frequency.

The center of gravity is determined by calculating the formula. In the same manner as described above, the center of gravity of the non-browsed contents, which are not shown, is also calculated by Formula (2) using the characteristic vectors of the non-browsed contents. The line connecting the center of gravity of the non-browsed contents and that of the browsed contents can be obtained as a user characteristic vector. Because the line is in the same direction as the line perpendicular to the separation plane, it is possible to calculate the separation plane and then obtain an orthogonal vector perpendicular thereto. The separation plane, however, is not always necessary in the NN method.

Accordingly, by using the browse frequency of the contents, it is possible to obtain the user characteristic vector, which is close to the user preferences compared to the case where the browse frequency is not used. Therefore, the contents can be evaluated according to the user preferences.

<Method for Generating a Separation Plane in View of Selection Order>

The processing in the history class separation unit 203 when a separation plane is generated in view of the order of the browsed contents will be described. Contents accessed most recently are generally assumed to be more important or more close to user preferences than contents accessed before that. The larger the time differences therebetween become, the more greatly the user preferences vary. Thus, it is obvious that the contents accessed more recently are more important. The processing when a separation plane is generated in view of the time differences (time-series components) will be described.

Figure 19:
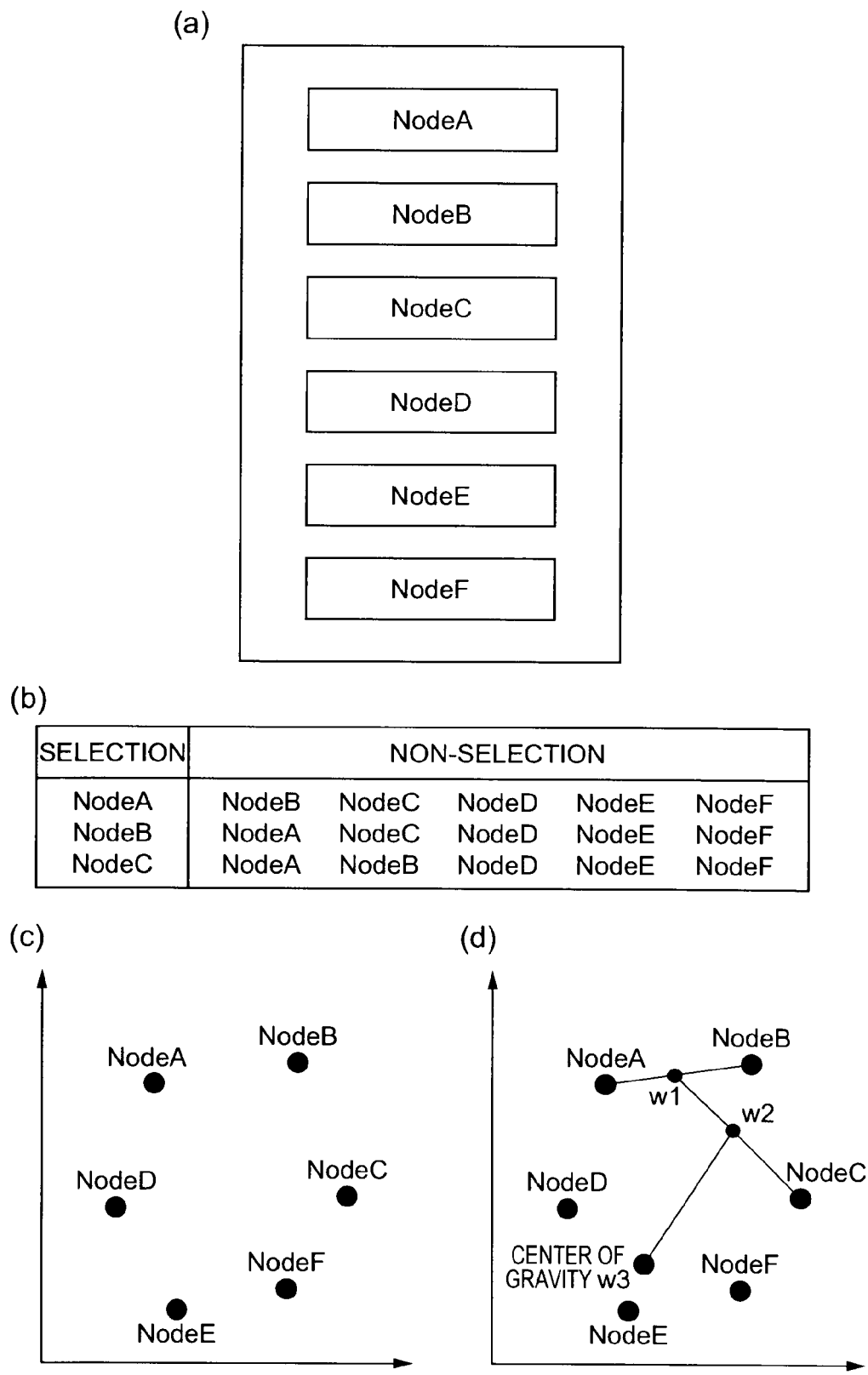
FIG. 19 is a conceptual diagram showing a process for calculating a user characteristic vector by the NN method in chronologically accessed order.

FIG. 19 is an explanatory diagram showing the processing for generating a user characteristic vector by the NN method in chronologically accessed order when the history class separation unit 203 generates a separation plane. FIG. 19A is an explanatory diagram of the menu screen, FIG. 19B is an explanatory diagram of the selection history of the contents that are selected by a user, FIG. 19C is a conceptual diagram showing characteristic vectors of the contents in the feature space, and FIG. 19D is a conceptual diagram for explaining the generation of the separation plane in view of the selection order. The selection history is stored in the browsing history table 207c.

As illustrated in FIG. 19A, the menu screen is configured with Node A to Node F. As illustrated in FIG. 19B, the contents are selected in order of Node A, Node B, and Node C. Thus, Node A, Node B, and Node C are the contents that are classified into the satisfactory class, and Node D, Node E, and Node F are the contents that are classified into the dissatisfactory class.

The concept of the processing when the separation plane is generated will be described with reference to FIG. 19C and FIG. 19D. As illustrated in FIG. 19C, Node A to Node F are positioned in the feature space according to the characteristic vectors thereof. The calculation is then performed such that the characteristic vector of the contents selected most recently has a great influence. As illustrated in FIG. 19D, the middle point w1 of Node A and Node B is calculated, and then the middle point w2 of the middle point w 1 and Node C is calculated to obtain the center of gravity of the satisfactory class.

By contrast, the center of gravity w3 of the dissatisfactory class is calculated based on Node D, Node E, and Node F. Because the concept of selection order does not exist in the dissatisfactory class, the center of gravity w3 based on the three nodes is calculated in the same manner as the normal processing. The separation plane v whose perpendicular is the line connecting the middle point w2 and the center of gravity w3 is then generated. In the present embodiment, an orthogonal vector perpendicular to the separation plane v is defined as the user characteristic vector, which is identical to the line connecting the center of gravity w3 and the middle point w2. Although the separation plane is calculated as a matter of convenience for the explanation of the present embodiment, the separation plane is not necessarily calculated when the NN method is used.

In this manner, a middle point of a characteristic vector and another characteristic vector is calculated, and a middle point of the obtained middle point and still another characteristic vector is then calculated to obtain the middle points in chronological order (the NN method is applied). Therefore, older access histories are less weighted, which makes it possible to calculate the center of gravity in view of the chronological order.

<Application to the Operation Menu>

In each of the methods described above, the example in that the menu screen is sent from the information distribution server 200, which serves as a Web site, is explained. However, it is not limited thereto, and recommendation operation information can be displayed on the operation menu of the cell phone 100 as recommendation information, for example.

For example, a characteristic vector may be allotted to each of the operation items on the operation menu to generate a user characteristic vector related to a user operation according to a user operation history. A similar user may be extracted based on the user characteristic vector to generate the recommendation operation information based on the operation history of the similar user. In this case, the operation history is configured to be sent and be stored to and in the information distribution server 200 at a predetermined time. The operation menu is configured such that the user can operate it to issue a recommendation operation information request when the user wants to see the operation history of the similar user.

FIG. 20 is an explanatory diagram showing parameters of characteristic vectors in a feature space related to the operation. As illustrated in FIG. 20, "incoming message", "videophone", "One Seg", "screen memo", and "text memo" are specified as terminal functions of the cell phone 100. As for the parameters that constitute the characteristic vectors, "phone", "Internet", "text", "memo", and "TV" are specified. In this manner, the characteristic vectors are specified with respect to the functions of the cell phone 100. For example, the parameters of "phone" and "text" are allotted with 1 in "incoming message", which indicates that "incoming message" is a function related to a phone and a text. The distributed information storage 205 stores the operation history information on the operation performed by the similar user, and receives a notification when the user performs an operation to display the operation menu. The relevance evaluation unit 210 generates recommendation operation information based on the operation history of the similar user. The content sending unit 208 sends the recommendation operation information to display the information in the cell phone 100.

In this manner, operations that are similar to or related to the operations performed by the user can be notified the user by applying the evaluation method according to the present embodiment to the operation menu and providing the recommendation operation information to the user.

The functional effects of the information distribution server 200 according to the present embodiment will be described. In the information distribution server 200, the user characteristic vector calculation unit 204 calculates the user characteristic vector of each of the users, and the similar user calculation unit 209 calculates the degree of similarity between the users based on the user characteristic vector of each of the users that is calculated as described above. The similar user calculation unit 209 selects a similar user who is similar to the first user based on the calculated degree of similarity. The relevance evaluation unit 210 can generate the recommendation information for the first user based on the characteristic vector of the selected similar user. In this manner, by evaluating the degree of similarity between the users using the user characteristic vectors, it is possible to determine the similar user more accurately than in the related art without obtaining a large amount of history information. In the related art, for example, the similar user needs to be determined based on 10,000 pieces of browsing history information. By contrast, according to the present invention, it is possible to determine the similar user accurately by using about ten pieces of browsing history information.

The content request receiving unit 201 receives the selection of the contents serving as one optional item from the menu screen serving as a plurality of optional items by the user operation. The content characteristic vector management table 207b stores the characteristic vectors of the selected contents and those of the non-selected contents. The history class separation unit 203 generates the flatly formed separation plane for separating the stored characteristic vectors of the selected contents and those of the non-selected contents. The user characteristic vector calculation unit 204 can generate the user characteristic vector based on the orthogonal vector perpendicular to the generated separation plane. Accordingly, it is possible to generate an accurate user characteristic vector.

In the information distribution server 200, the relevance evaluation unit 210 evaluates the browsed contents based on the multiplied value that is obtained by multiplying the degree of similarity calculated by the similar user calculation unit 209 by the inner product value of the user characteristic vector of the similar user and the characteristic vectors of the browsed contents that are browsed by the similar user. The recommendation information is generated from the browsed contents based on the evaluation. In this manner, it is possible to perform a weighting process depending on the degree of similarity, and generate the recommendation information in accordance with results of the weighting process. Accordingly, appropriate recommendation information can be generated depending on the degree of similarity.

The invention claimed is:

1. A recommendation information generation apparatus comprising:
   a vector acquisition unit that acquires a user characteristic vector of each of users and includes:
      a receiving unit that receives a selection of one optional item from a plurality of optional items by a user operation;
      a storage unit that stores a satisfactory feature vector of the optional item that is received by the receiving unit and dissatisfactory feature vectors of optional items that are not received by the receiving unit; and
      a user characteristic vector generation unit that generates an orthogonal vector perpendicular to a separation plane that separates the satisfactory feature vector of the selected optional item and the dissatisfactory feature vectors of non-selected optional items, which are stored in the storage unit, as the user characteristic vector;
   a similarity calculation unit that calculates a degree of similarity between the users based on the user characteristic vector of each of the users that is acquired by the vector acquisition unit;
   a selection unit that selects a similar user who is similar to a first user based on the degree of similarity calculated by the similarity calculation unit; and
   a generation unit that includes a processor that generates recommendation information for the first user based on the characteristic vector of the similar user selected by the selection unit.

2. The recommendation information generation apparatus according to claim 1, wherein the vector acquisition unit includes:
   the receiving unit that receives a selection of one optional item from a plurality of optional items by a user operation and non-selected optional items; and
   the user characteristic vector generation unit that generates the user characteristic vector based on dissatisfactory feature vectors of the optional items that are not received by the receiving unit.

3. The recommendation information generation apparatus according to claim 1, wherein the generation unit evaluates a browsed content that is browsed by the similar user based on the degree of similarity that is calculated by the similarity calculation unit and an inner product value of a user characteristic vector of the similar user and a feature vector of the browsed content, and generates recommendation information from the browsed content based on the evaluation.

4. A recommendation information generation method comprising:
   acquiring a user characteristic vector of each of users, the step of acquiring including:
      receiving a selection of one optional item from a plurality of optional items by a user operation;
      storing a satisfactory feature vector of the optional item that is received and dissatisfactory feature vectors of optional items that are not received; and
      generating an orthogonal vector perpendicular to a separation plane that separates the stored satisfactory feature vector of the selected optional item and the stored dissatisfactory feature vectors of non-selected optional items, as a user characteristic vector;
   calculating a degree of similarity between the users based on the user characteristic vector of each of the users that is acquired in the acquiring;
   selecting a similar user who is similar to a first user based on the degree of similarity calculated in the calculating; and generating recommendation information for the first user based on the characteristic vector of the similar user selected in the selecting.

5. The recommendation information generation apparatus according to claim 1, wherein the user characteristic vector generation unit maps the satisfactory feature vector to a relative space based on the dissatisfactory feature vectors.

6. The recommendation information generation apparatus according to claim 5, wherein the relative space includes at least two dissatisfactory feature vectors mapped to a same position and at least two instances of the satisfactory feature vector, each instance of the satisfactory feature vector being in a position relative to the position of the dissatisfactory feature vectors.

7. The recommendation information generation apparatus according to claim 5, wherein at least two dissatisfactory feature vectors are mapped to a position corresponding to an origin of the relative space.

* * * * *